US006826911B2

United States Patent
Carver et al.

(10) Patent No.: US 6,826,911 B2
(45) Date of Patent: Dec. 7, 2004

(54) STORAGE OF ENERGY PRODUCING FLUIDS AND PROCESS THEREOF

(75) Inventors: Calvin R. Carver, Short Hills, NJ (US); Frank T. Bahniuk, Quechee, VT (US)

(73) Assignee: Pomfret Storage Company, LLC, Short Hills, NJ (US)

( * ) Notice: Subject to any disclaimer, the term of this patent is extended or adjusted under 35 U.S.C. 154(b) by 10 days.

(21) Appl. No.: 10/327,480

(22) Filed: Dec. 20, 2002

(65) Prior Publication Data

US 2003/0150213 A1 Aug. 14, 2003

Related U.S. Application Data

(63) Continuation-in-part of application No. 09/804,502, filed on Mar. 12, 2001, now Pat. No. 6,516,616.

(51) Int. Cl.⁷ .............................................. F01K 1/00
(52) U.S. Cl. .......................... 60/659; 62/53.1; 62/45.1
(58) Field of Search ................. 60/659; 62/53.1, 62/45.1, 50.1, 50.2, 50.3, 50.7

(56) References Cited

U.S. PATENT DOCUMENTS

| | | | | |
|---|---|---|---|---|
| 3,602,551 A | * | 8/1971 | Velegol ........................ 406/39 |
| 3,724,229 A | * | 4/1973 | Seliber ........................ 62/50.3 |
| 3,745,770 A | * | 7/1973 | Fraser et al. .................. 405/59 |
| 3,807,181 A | | 4/1974 | Kuhne |
| 3,817,046 A | * | 6/1974 | Aoki et al. ..................... 62/612 |
| 3,848,427 A | | 11/1974 | Loofbourow |
| 3,950,958 A | * | 4/1976 | Loofbourow ................. 62/53.1 |
| 4,037,526 A | * | 7/1977 | Jaekle ......................... 454/166 |
| 4,185,456 A | | 1/1980 | Cummings |
| 4,224,800 A | * | 9/1980 | Grennard ..................... 62/53.1 |
| 4,513,350 A | | 4/1985 | Coleman |
| 4,523,548 A | | 6/1985 | Engel et al. |
| 4,577,679 A | | 3/1986 | Hibshman |
| 4,671,700 A | | 6/1987 | Boulanger et al. |
| 4,805,674 A | | 2/1989 | Knowlton |
| 4,858,640 A | | 8/1989 | Kaufmann |
| 5,207,530 A | | 5/1993 | Brooks et al. |
| 5,333,465 A | | 8/1994 | McBride |
| 5,431,482 A | | 7/1995 | Russo |
| 5,461,023 A | | 10/1995 | Chang et al. |
| 5,511,905 A | | 4/1996 | Bishop et al. |
| 5,569,154 A | | 10/1996 | Navetta |
| 5,613,532 A | | 3/1997 | Kaliszewski |
| RE35,639 E | * | 10/1997 | Vander Heyden et al. .... 374/36 |
| 5,892,148 A | | 4/1999 | Durup et al. |
| 5,957,539 A | | 9/1999 | Durup et al. |
| 5,988,760 A | | 11/1999 | Durup et al. |
| 6,516,616 B2 | * | 2/2003 | Carver et al. ................. 60/659 |
| 6,557,374 B2 | * | 5/2003 | Kotliar ........................ 62/640 |

* cited by examiner

Primary Examiner—Hoang Nguyen
(74) Attorney, Agent, or Firm—Kenyon & Kenyon

(57) ABSTRACT

A fluid storage facility includes an arrangement for transferring liquefied propane or butane from a supply source of a pipeline or at least one delivery vehicle to at least one pumping station via at least one weighing station, the pumping station transferring the liquefied propane or butane to at least one storage vessel, the at least one storage vessel being secured within a tunnel that is one of a railroad tunnel, a highway tunnel, an aqueduct tunnel or other transportation tunnel, the tunnel passing through the earth, and including an entrance at both ends, each of which is directly connected and directly accessible at ground level, and being configured to contain the at least one storage vessel for the storage of liquefied propane or butane.

17 Claims, 9 Drawing Sheets

(COMPRESSED NATURAL GAS SERVICE)

(LIQUEFIED NATURAL GAS SERVICE)

(COMPRESSED AIR SERVICE)

(LIQUEFIED PROPANE AND/OR BUTANE SERVICE)

LIQUEFIED PROPANE AND/OR BUTANE SERVICE 70

TYPICAL CROSS SECTION OF TUNNEL

LONGITUDINAL SECTION OF TUNNEL STORAGE SYSTEM

VIEW OF FABRICATED END TUNNEL WALL (82) SHOWING SEALED CHAMBER AND MAN ACCESS DOOR

TYPICAL END WALL OF TUNNEL
SHOWING SEALED CHAMBER AND ACCESS DOORS

STORAGE OF ENERGY PRODUCING FLUIDS AND PROCESS THEREOF

RELATED APPLICATION INFORMATION

This application is a continuation-in-part application of commonly assigned and U.S. patent application Ser. No. 09/804,502, filed Mar. 12, 2001 now U.S. Pat. No. 6,516,616.

FIELD OF THE INVENTION

The present invention relates to the storage of energy producing material for subsequent use, and, more particularly, relates to the utilization of a tunnel structure as an integral part of a liquefied propane or butane storage system.

BACKGROUND INFORMATION

Optimal use of propane or butane storage traditionally includes buying the material "off season" and using it in "peak season". Other techniques for storing propane or butane include storing them directly within underground leached salt caverns, within impervious mined caverns deep underground, or in tank structures that are designed specifically to hold liquefied propane or butane either at ambient temperature or in a slightly refrigerated state and may be above ground. Several tanks containing propane or butane at ambient temperature may be manifolded together in a storage facility to effectively act as a single storage unit. The facilities for all of the above provide for putting the fluid, propane or butane, into the storage medium, and for removal of the fluid when required.

Liquefied propane or butane may be stored in multiple 30,000 to 60,000 gallon steel tanks located above ground and supported by concrete piers. Large volume storage has been accomplished in leached salt caverns, in mined caverns within impervious rock strata deep under the surface of the ground or in large refrigerated tanks located above ground.

It is believed that there is no economically viable way of storing very large volumes of propane or butane at ambient temperature in a manner that allows the propane or butane to be accessed at ground level. In contrast, only by refrigerated storage can very large volumes of propane or butane currently be stored at ground level in a single location.

SUMMARY OF THE INVENTION

An exemplary fluid storage facility of the present invention includes an arrangement for transferring liquefied propane or butane from a supply source or at least one delivery vehicle to at least one pumping station via at least one weighing station, the pumping station transferring the liquefied propane or butane to at least one storage vessel. The at least one storage vessel is secured within a newly constructed tunnel or one that has been abandoned as a railroad tunnel, a highway tunnel and/or an aqueduct tunnel. The tunnel passes through the earth and includes an entrance at both ends, each of which is directly connected and directly accessible at ground level, and is configured to contain the at least one storage vessel for the storage of the liquefied propane or butane.

In an exemplary embodiment of the above exemplary fluid storage facility, the at least one storage vessel includes a plurality of storage vessels manifolded together to act as a single storage unit.

In an exemplary embodiment of the above fluid storage facility, first and second gas tight end walls are included at each end of the tunnel configured to seal the tunnel. The first and second end walls include attached sealed chambers, each chamber having two gas tight sealed access doors allowing entrance first into the corresponding chamber and then into the tunnel.

In an exemplary embodiment of the above fluid storage facility, the tunnel is filled with a mixture of air and an inert gas at a pressure slightly higher than atmospheric preventing combustion. According to a particular implementation, the inert gas may include nitrogen.

An exemplary embodiment of the above fluid storage facility includes a first pipeline coupled to the pumping station and to the at least one storage vessel for filling the at least one storage vessel, a second pipeline coupled to the pumping station and to the at least one storage vessel for removing liquid from the at least one storage vessel, a third pipeline coupled to the pumping station and to the at least one storage vessel for transporting any gas that is released through over pressure valves on the at least one storage vessel, and a fourth pipeline coupled to the pumping station and configured to provide for introduction of the inert gas into the tunnel. The first, second, third and fourth pipelines may pass through at least one of the gas tight end walls of the tunnel.

An exemplary method of providing a fluid storage facility having an entrance at both ends, each of which is directly connected and directly accessible at ground level, includes renovating a tunnel previously constructed as a transportation tunnel (such as a railroad or highway tunnel) or as an aqueduct to act as an integral storage system component for containing at least one storage vessel of an ambient temperature energy producing fluid. The renovated tunnel includes gas tight end wall chambers positioned at each end of the tunnel, each chamber having gas tight sealed access doors. The exemplary method also includes providing access for maintenance in the tunnel via the gas tight sealed access doors and providing access for at least one of an addition and a removal of storage tanks through an end wall of the tunnel.

DETAILED DESCRIPTION

An exemplary embodiment of the present invention provides for the utilization of a substantially horizontal straight opening in the earth with access at ground level at both ends, such as, for example, an inactive or abandoned railroad, a highway or aqueduct tunnel, or a similar structure for the storage of large volumes of (a) compressed air, (b) gaseous fuel in the form of compressed or liquefied natural gas, or (c) liquefied propane or butane. The storage facility can be an integral part of an associated service system that can provide rapid delivery of: (1) compressed air to a turbine generator; (2) natural gas in times of high demand for delivery to, (a) a natural gas transmission pipeline, (b) a natural gas distribution system, (c) a turbine generator at the site, or (d) an end user such as an industry or electric power generator, which can be located away from the site; and (3) propane or butane, as may be required from time to time.

Figure 1:
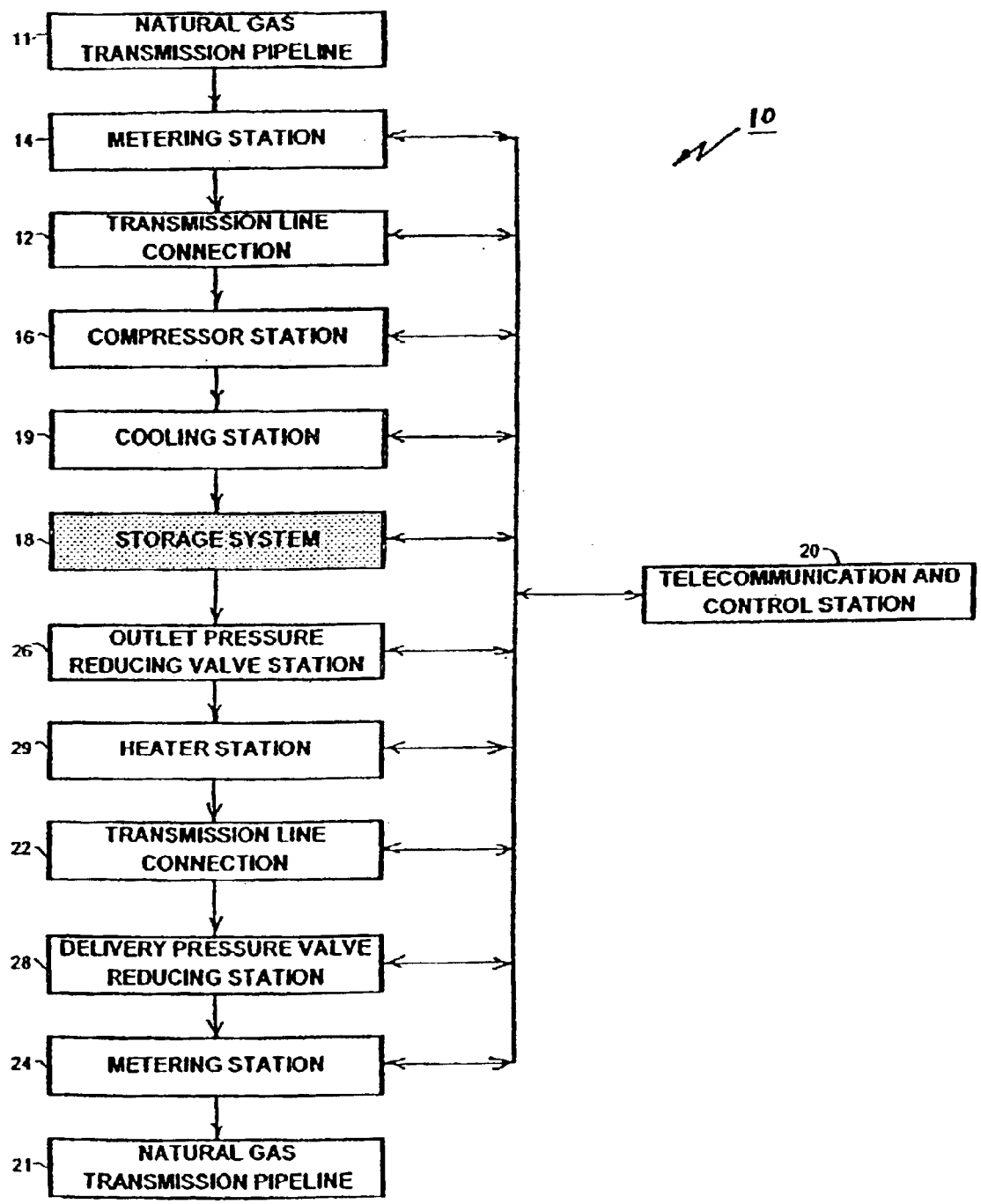
FIG. 1 is a block diagram of an exemplary embodiment of a system for processing and storing compressed natural gas.

FIG. 1 shows a block diagram of a system for processing and storing Compressed Natural Gas 10. When the storage service system is arranged or configured for Compressed Natural Gas Service 10, the system will provide for a Transmission Line Connection (TLC) 12 that allows natural gas to be delivered to and from a Natural Gas Transmission Pipeline (NGTP) 11 via a metering station 14. The TLC 12, however, may be arranged or configured to operate at a pressure higher than the rated pressure of the NGTP 11 facility to which it is connected. The TLC 12 delivers gas from the NGTP 11 to the Storage System (SS) 18. The gas going into SS 18 passes through a Compressor Station (CS) 16 that compresses the gas to the appropriate pressure for the SS 18 and a cooling station 19.

The SS 18 releases natural gas through an Outlet Pressure Reducing Valve Station (OPRVS) 26 having a connection to a turbine generator or to a Delivery Pressure Reducing Valve Station (DPRVS) 28. The OPRVS 26 is used to reduce the pressure to the appropriate pressure required for delivery to the Transmission Line Connection (TLC) 22, or to the "on site" electric generation turbine unit. Such pressure reduction results in a cooling of the gas, and a Heater Station (HS) 29 warms up the gas to the normal temperature of operation of TLC 22. Moving the gas through the DPRVS 28 and the Metering Station (MS) 24 allows delivery of the gas to NGTP 21. Natural gas flowing from NGTP 11 to the SS 18 passes through MS 14, into TLC 12, then into CS 16 and on to cooling station 19. The Cooling Station 19 is located between the CS 16 and the SS 18. The function of the Cooling Station 19 is to reduce the temperature of the compressed gas to an acceptable level for entry into the storage system. The natural gas passing through CS 16 is compressed to the appropriate pressure for the SS 18. For economy of construction and operation, the SS 18 and its auxiliary components may be configured so that a single Metering Station may be arranged to fulfill the functions of both MS 14 and MS 24. Similarly, TLC 12 and TLC 22 may be the same pipeline if the Storage Service System is only connected to a single pipeline. The function of the MS 14 and/or 24 is to measure and record the amount of energy in BTUs, flowing through the station either into or out of the storage system. A Telecommunication and Control Station (TCS) 20 monitors and controls the operation of at least the cooling station 19, the heater station 29, the OPRVS 26, the metering stations 14 and 24, and the DPRVS 28. It is capable of telecommunication of all data for remote operation of the entire storage and service facility. Should delivery be required to a natural gas distribution system, or directly to an end user, an additional stage of pressure reduction in DPRVS 28 may be utilized to reduce the pressure necessary for connection to a distribution main for delivery to a gas distribution system or end user. Natural Gas Transmission Pipelines 11 and 21 may be different facilities or could be one and the same facility.

Should there be a market for electricity, the output from the OPRVS 26 may be controlled to between 300 or 500 psig, or as required, to fuel a turbine generator. The output of the generator may be connected to an electric transmission facility for sale to third parties, (which is not shown).

Figure 2:
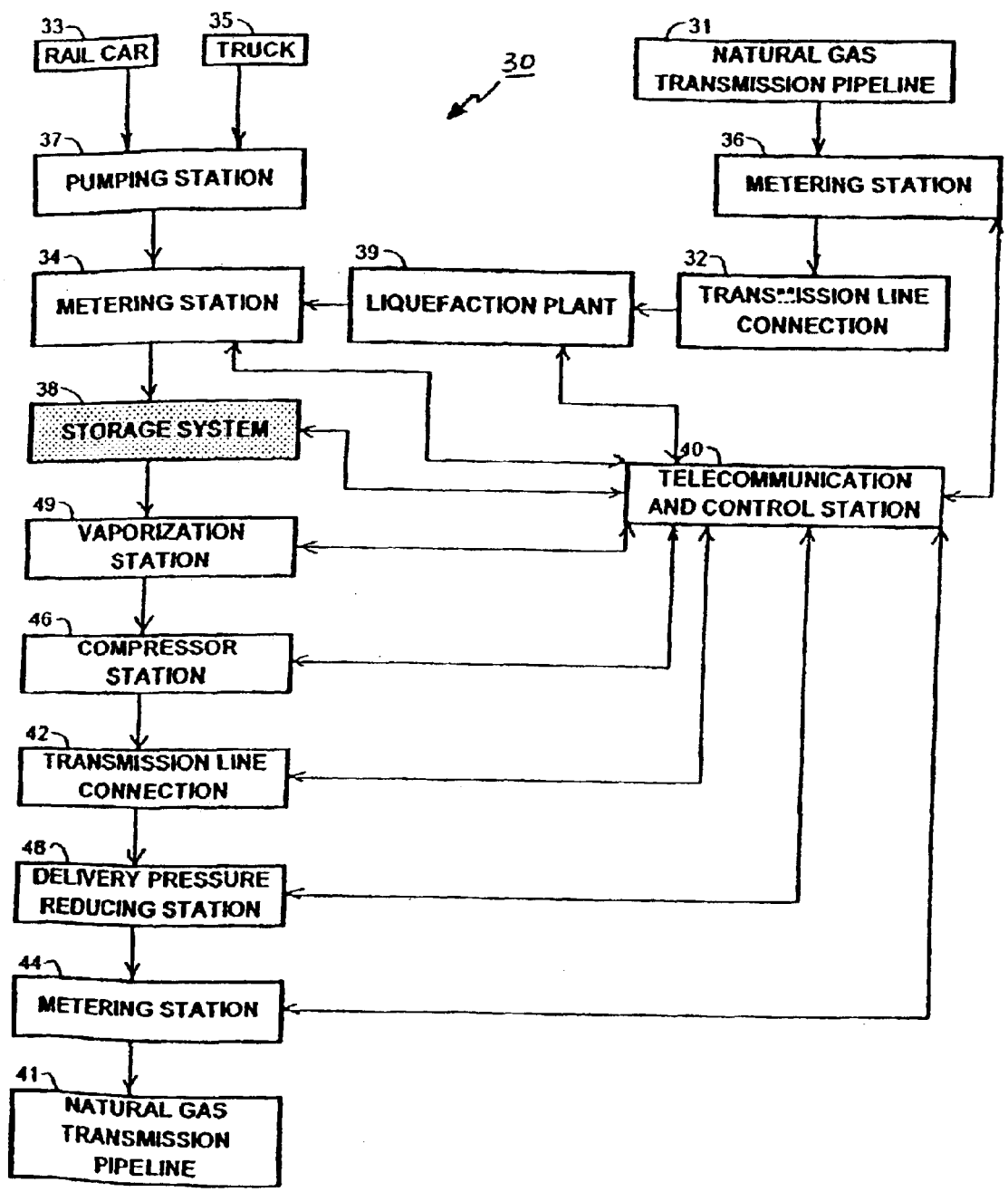
FIG. 2 is a block diagram of an exemplary embodiment of a system for processing and storing liquefied natural gas.

FIG. 2 is a block diagram of an exemplary embodiment of a system for processing and storing Liquefied Natural Gas (LNG) 30. When the storage service system is arranged or configured for LNG, the system provides for the input to storage for an LNG storage service system which may be in the form of: (a) direct liquid injection (LNG); or (b) natural gas delivered from a natural gas transmission line connection (TLC) and processed though a liquefaction plant to change the state from gas to liquid. The direct liquid injection of LNG may be provided by having LNG delivered by rail car 33 to a rail siding where a pipe loading and unloading system would pump the liquid via a pumping station 37 through a metering station 34 and into the insulated storage vessel(s) 38. The LNG may also be delivered by LNG delivery trucks 35 to a loading and unloading facility which may pump the liquid via a pumping station 37 into the same Metering Station 34, and into the insulated storage vessel(s) 38. A feed stock of natural gas may be taken from a Natural Gas Transmission Pipeline (NGTP) 31, which gas may flow through Metering Station 34 or 36 and a Transmission Line Connection (TLC) 12 or 32. The TLC 32 may run the gas into the Liquefaction Plant 39. The LNG coming out of the Liquefaction Plant 39 may be connected to the same input line that comes from the rail and truck unloading facilities and into the insulated storage vessel(s) 38.

The output from the system begins with the withdrawal of LNG from the storage facility. The liquid may then be passed though a Vaporization Station 49 to convert it to natural gas in a gaseous state. The natural gas may then be passed through the Compressor Station 46 to raise the pressure to meet pipeline requirements. It may then pass through the TLC 42 for delivery through a pipeline Delivery Pressure Reducing Valve Station (DPRVS) 48 and Metering Station 44 to the NGTP 41. An Outlet Pressure Reducing Valve Station (OPRVS) (not shown) which is connected to a turbine generator (not shown) can also be connected to the DPRVS 48 for the processing of the natural gas. A Telecommunication and Control Station (TCS) 40 monitors and controls the operation of the Liquefaction Plant 39, the Vaporization Station 49, the OPRVS (not shown), the Metering Station 44 and the DPRVS 48. The TCS 40 is capable of telecommunication of all data and for remote operation of the entire storage and service facility.

Should delivery be required to a natural gas distribution system, or directly to an end user, an additional pressure reducing stage to the DPRVS 48 may be utilized to reduce the pressure to the pressure necessary for connection to a distribution main for those deliveries. Similarly for the case of natural gas, Metering Station 36 and Metering Station 44 may be combined into a single unit. Likewise, Transmission Line Connection 32 and Transmission Line Connection 42 may be configured as a single entity if only one NGTP is involved. Natural Gas Transmission Pipelines 31 and 41 may be at different facilities or, alternatively, at the same facility. Market economics may determine if and when the service station 30 will include the liquefaction facility 39. Should there be a suitable market for electricity, the output from the compressor station 46 may be controlled to about 300 or 500 psig, or as required, to fuel a turbine generator (not shown). The output of the turbine generator may be connected to an electric transmission facility for sale to third parties.

Figure 3:
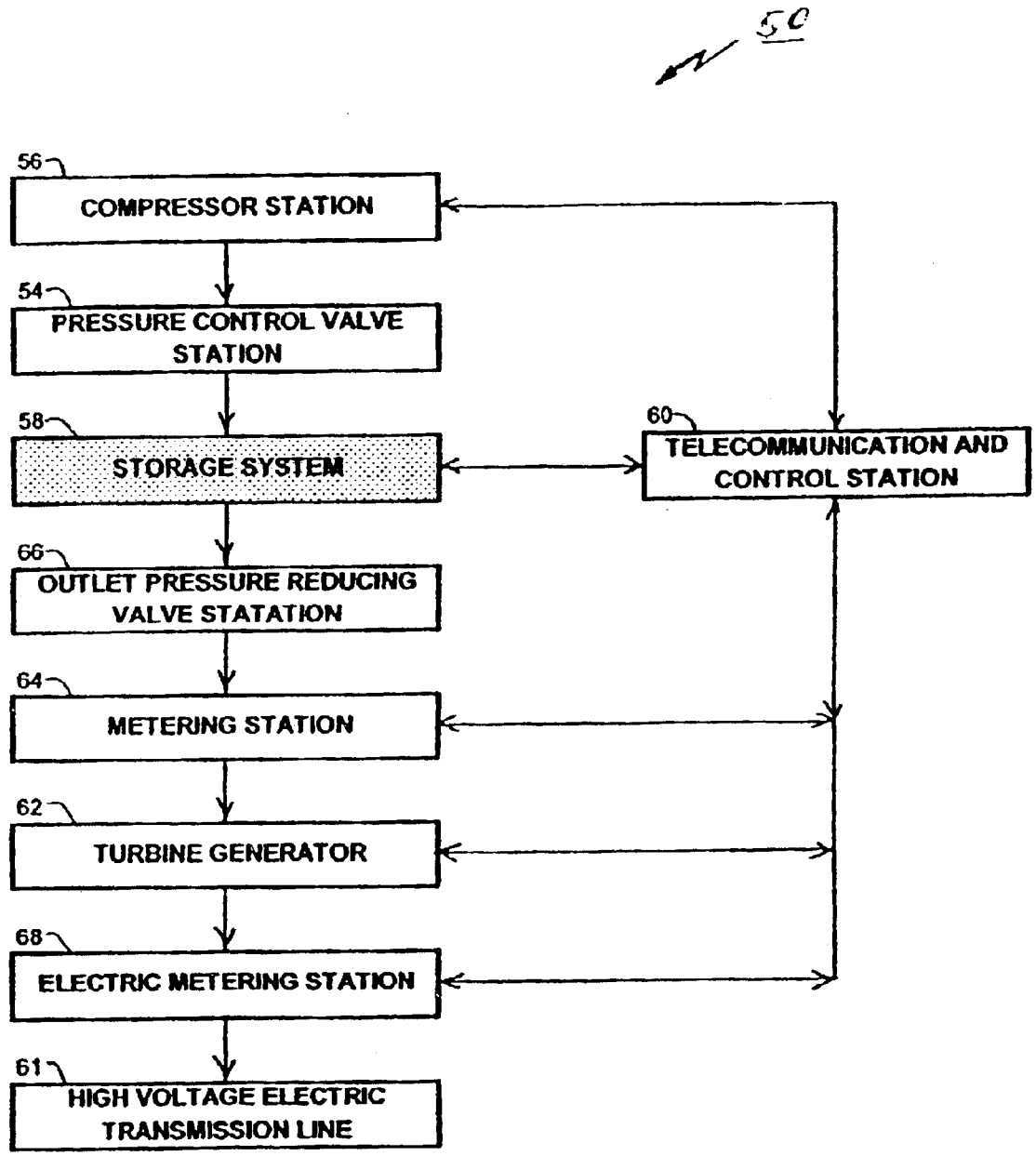
FIG. 3 is a block diagram of an exemplary embodiment of a system for processing and storing compressed air.

FIG. 3 is a block diagram of an exemplary embodiment of a system for processing and storing Compressed Air 50. When the storage service system is arranged or configured for compressed air storage and service, the system provides for the use of a Compressor Station (CS) 56 with a pressure control valve station (PCVS) 54 to store the compressed air into the storage system 58. The use of compressed air to generate electricity may require that one or more Turbine Generator(s) (TG) 62 are installed at the site. An outlet pressure reducing valve station (OPRVS) 66, with direct connection to the turbine generator 62 utilizes the compressed air to drive the TG 62 after the compressed air has passed through a metering station (MS) 64. The generation of electricity by an air driven turbine generation unit(s) 62 leads to transmission of the electricity from the site via high voltage electric transmission lines 61 after being metered in Electric Metering Station 68. Compressed Air may be stored in one or more large volume vessels or in a multiplicity of high-pressure pipes or cylinders in Storage System 58. If more than one pipe or vessel is utilized, then they may be manifolded together to effectively function as a single storage unit. The rate of removal is traditionally many times the rate of injection. This system allows removal of compressed air at very high or very low rates dependent upon market conditions. The economics may determine whether the cylinders or pipes be filled at night or other off peak times to provide for delivery at high value hourly peaking times that normally occur during the daytime. A Telecommunication and Control Station (TCS) 60 monitors and controls the compressor station 56, the Storage System 58, the Metering Station 64, and the Electric Metering Station 68.

Figure 4:
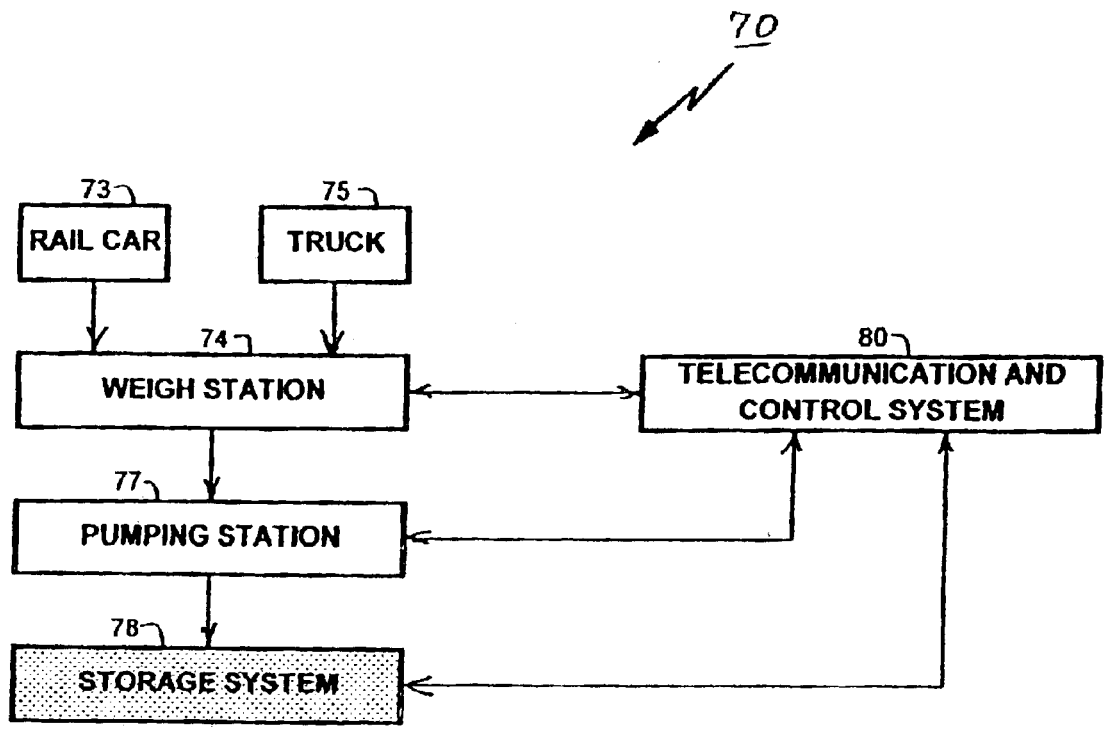
FIG. 4 is a block diagram of an exemplary embodiment of a system for processing and storing liquefied propane or butane.

FIG. 4 is a block diagram of an exemplary embodiment of a system for processing and storing liquefied propane or butane 70. When the storage service system is arranged or configured for use of liquefied propane or butane storage 70 and service, the system 70 provides for an inlet piping and control valve system for delivery of liquefied propane or butane from either rail car 73 or truck 75. Delivery vehicles 73 and/or 75 may be weighed at Weigh Station(s) 74 to verify the amount of material (liquid) being received. A Pumping Station 77 is used to help evacuate the liquid from rail cars 73 or trucks 75. This Pumping Station 77 can also be arranged or configured for outlet pumping from the storage facility 78. Outlet piping and a control valve system for delivering the propane or butane to a facility utilizing the gaseous fuel at the site, or to trucks 75 or railcars 73 in a liquefied state can also be provided. A Telecommunication and Control Station (TCS) 80 monitors the weigh station 74, a pumping station 77 and the storage facility for liquefied propane or butane 78.

The construction of a Tunnel Storage System may start with the restoration of the abandoned or inactive tunnel structure. The first step in all cases would be to deal with any water intrusion into the tunnel. Grouting with either chemical or other type of grout may deal with any water seepage. If the water intrusion problem is too severe to correct by grouting, then a water drainage system may be built into the floor of the tunnel. Given that the tunnels proposed for use may be straight both as to alignment and grade, accomplishing this may be a relatively simple matter. If there is an overall grade to the tunnel, then a gravity water drain can be utilized. If there is no grade, then the water drainage system may be constructed utilizing pumping chambers and gravity feeds installed in the floor of the tunnel structure.

In the case of exposed rock faced tunnels, the next step may be the removal of any additional rock face that may be necessary to provide the desired configuration or the additional volume requirement for that particular application. This may be done coincidentally with the elimination of any water intrusion problem as discussed earlier. In the case of concrete faced (lined), or other material faced (lined) tunnels, the material facing may be inspected and repaired to bring it up to acceptable structural standards. The water removal system may be constructed at this time.

Where large diameter vessels are utilized for liquefied natural gas (LNG), liquefied propane (LP) or liquefied butane (LB), a non-corrosive electrically insulating material roller or pad system may be installed to facilitate the installation of the vessel(s). To allow the large cylindrical or other shaped sections to be uniformly positioned in the structure and easily inserted into the tunnel structure, rollers can be used when a few large tanks are utilized. The vessel may be built in separate cylindrical or other shaped sections that may be welded together outside of the tunnel structure. The welds may be X-rayed and the sections pushed and/or pulled into the tunnel leaving an end outside for the welding of the next section(s) of the vessel. The piping necessary for the withdrawal of the LNG, LP or LB may be attached to the appropriate vessel section and may be installed in sections along with vessel sections. All of the pipes may be welded and X-rayed at the same time as the vessel sections.

For an LNG or other liquefied system, in addition to the liquid withdrawal line, a gas removal line may be included. Even with maximum insulation placed around the tank, there may be some LNG or other liquefied system that converts to a gaseous state. Piping may be used to "top off" and withdraw this converted gas. This piping may also be installed with the vessel tank sections. After the vessels are in place, the annular space between the vessel and the tunnel structure may be sealed by injection, or it could otherwise be filled with an expanding insulating material that would meet the insulating requirements for LNG storage. The insulation may also be chosen to act as a seal against water intrusion and therefore minimize and possibly, depending upon conditions, eliminate the need for a water removal system.

When the tunnel structure is used for the storage of compressed air or compressed natural gas, a single large storage vessel or a multiplicity of pipes or pressure storage vessels may be utilized. The wall thickness of the vessel(s) may be determined by the vessel(s) configuration and the maximum pressure to be utilized for storage. In the case of a single, or only a few large vessels, additional factors may be considered such as the extent of integration and reinforcement of the vessel(s) by the surrounding rock of the tunnel structure. When a multiplicity of pipes are used, an aisle may be provided in the center of the structure for access to the pipes and for facilitation of any maintenance work on the piping or the water removal system. A rack structure around the maintenance aisle may be utilized to provide electrical isolation between pipes with pads or rollers to allow installation of the pipes and for non-corrosive supports. The pipes may be welded and x-rayed outside of the tunnel and pushed and/or pulled into the tunnel section by section. The annular space may be filled with nitrogen or some other inert gaseous material when the construction is complete and the storage service is activated.

With the present method and system, an inactive or abandoned tunnel, previously used or intended to be used for a highway, a railroad or as an aqueduct, becomes a storage shell and/or a reinforcing integral structural component, for the storage of LP or LB or other liquefied gas.

The exemplary embodiments of the present inventions provide these and further advantages as explained in the parent of the present case, U.S. patent application Ser. No. 09/804,502, the full contents of which are hereby explicitly incorporated herein by reference.

An exemplary embodiment of the present invention provides for the utilization of a tunnel that includes a straight-line structure having an entrance at both ends, each of which is directly connected and directly accessible at ground level (horizontally) for the storage of large volumes of gaseous fuel in the form of liquefied propane or butane at ambient temperature with one or more tanks permanently installed within the tunnel structure. The gas tight end wall at each end of the tunnel seals the tunnel structure and incorporates a gas tight fabricated sealed chamber for access to the tunnel without losing the positive pressure contained therein. An air and inert gas mixture fills the void space in the tunnel between the storage tanks and the tunnel walls. The fabricated chamber structures at each end that seal the tunnel allow for the maintenance of a positive pressure of the air and inert gas mixture. The chambers also provide a way to maintain the positive pressure in the tunnel structure for routine entry into the tunnel. Should there be a need to remove any of the tanks, the removable portion of the end wall structure can be opened. In that case, the positive pressure in the tunnel structure may not be maintained.

Figure 8:
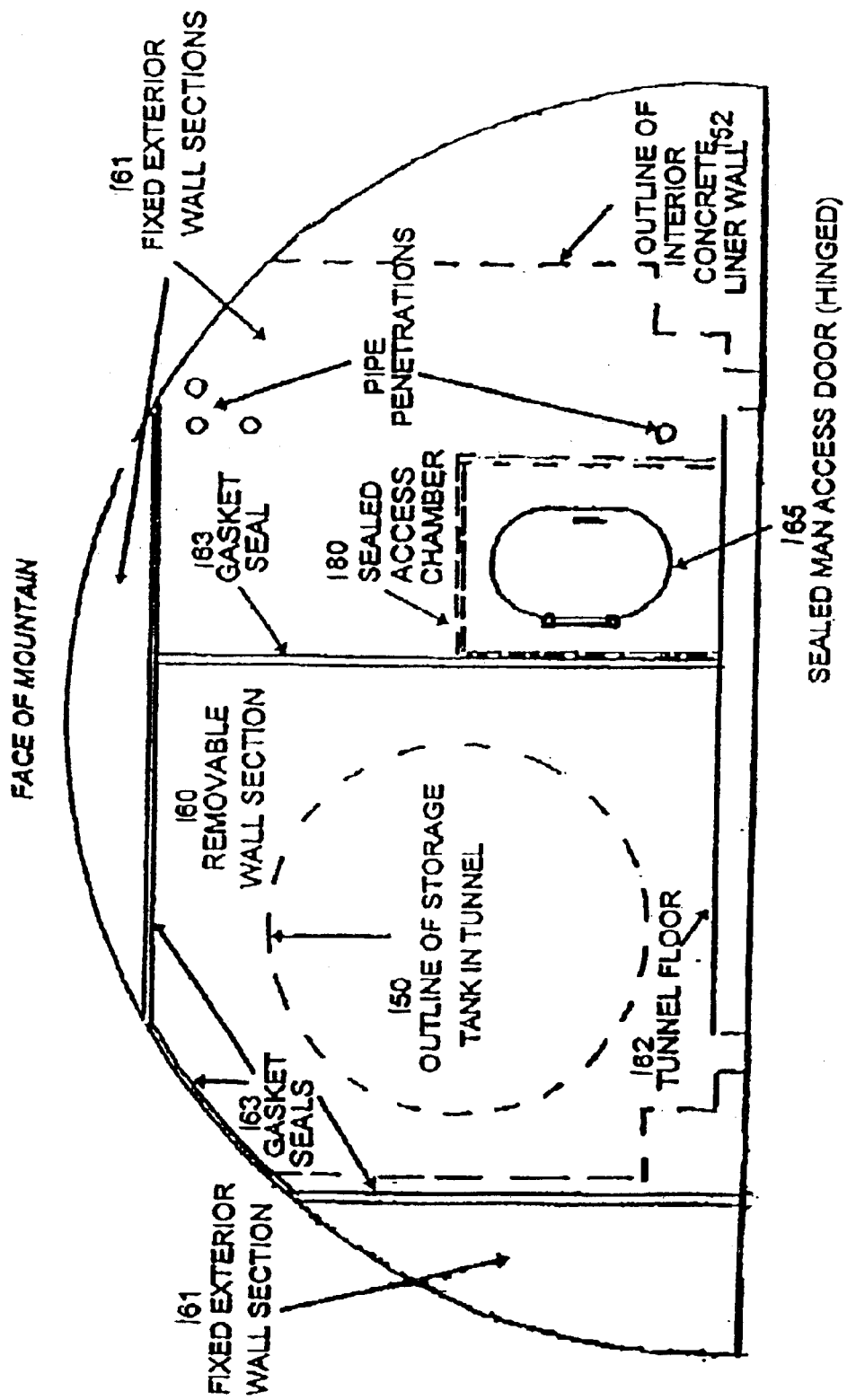
FIG. 8 shows a front view of the fabricated gas tight end wall of FIG. 7.
Figure 9:
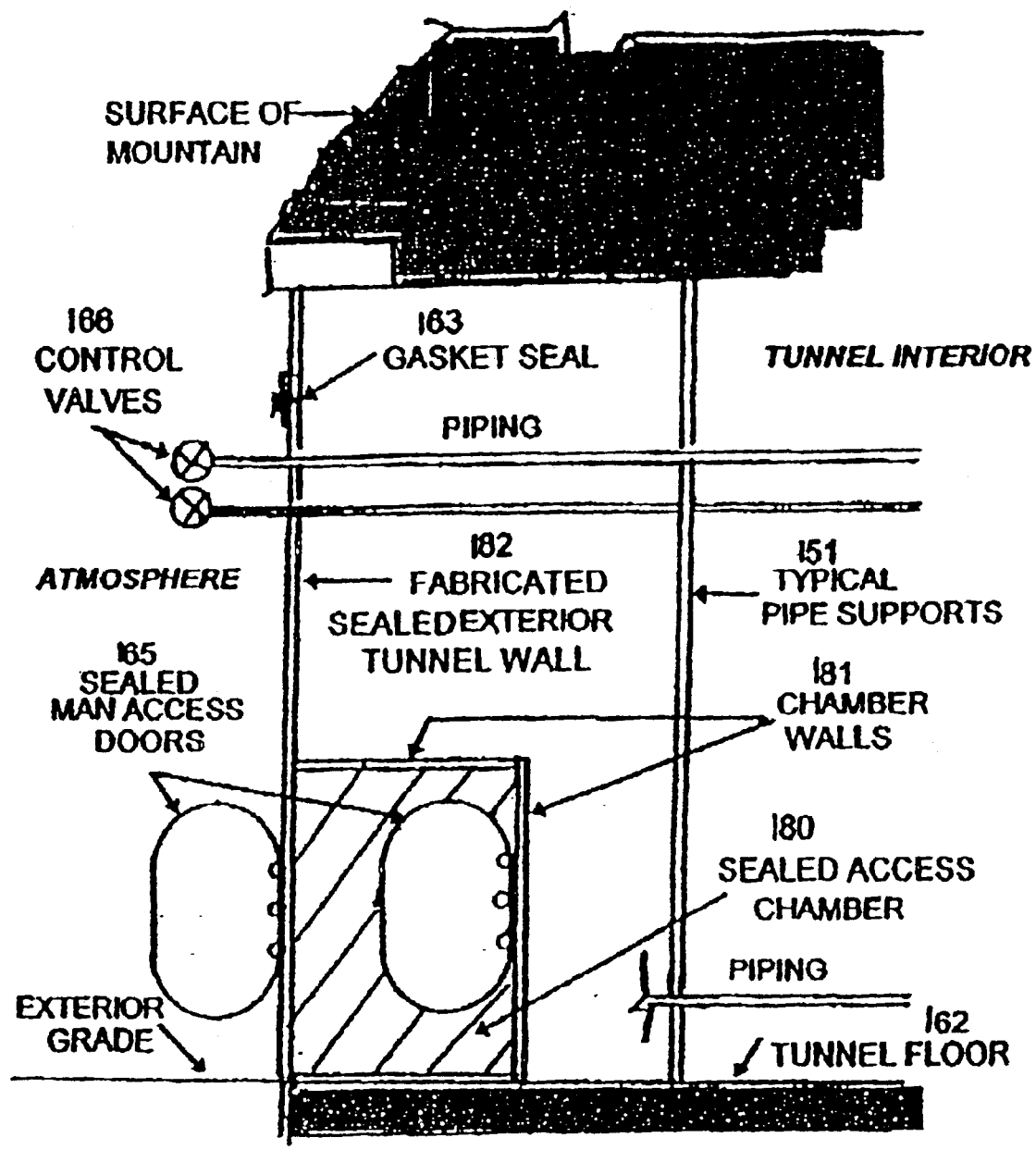
FIG. 9 is a vertical cross section through the exemplary tunnel of FIGS. 6 to 8 at the end of the tunnel.

Access for maintenance of the tunnel structure and/or the storage system and its components is accomplished through two gas tight "sealed access doors" that allow passage through the fabricated end wall chamber structure. These doors may be fabricated in a fashion similar to those found on naval vessels where they provide watertight integrity. Entrance is first made into the chamber through the outside door. When that door is closed, the entry door to the tunnel can be opened and entry to the tunnel itself can then be made. FIG. 8 shows how a portion of the gas tight end wall section 160 can be fully opened or removed to allow installation of or removal of, the storage tanks 150 from the tunnel storage system. FIG. 9 also shows the inner and outer access doors 165 in the end wall sealed access chamber 180 that can be utilized for routine access into the tunnel structure without losing the positive pressure inert gas and air mixture contained within for fire suppression purposes.

Figure 5:
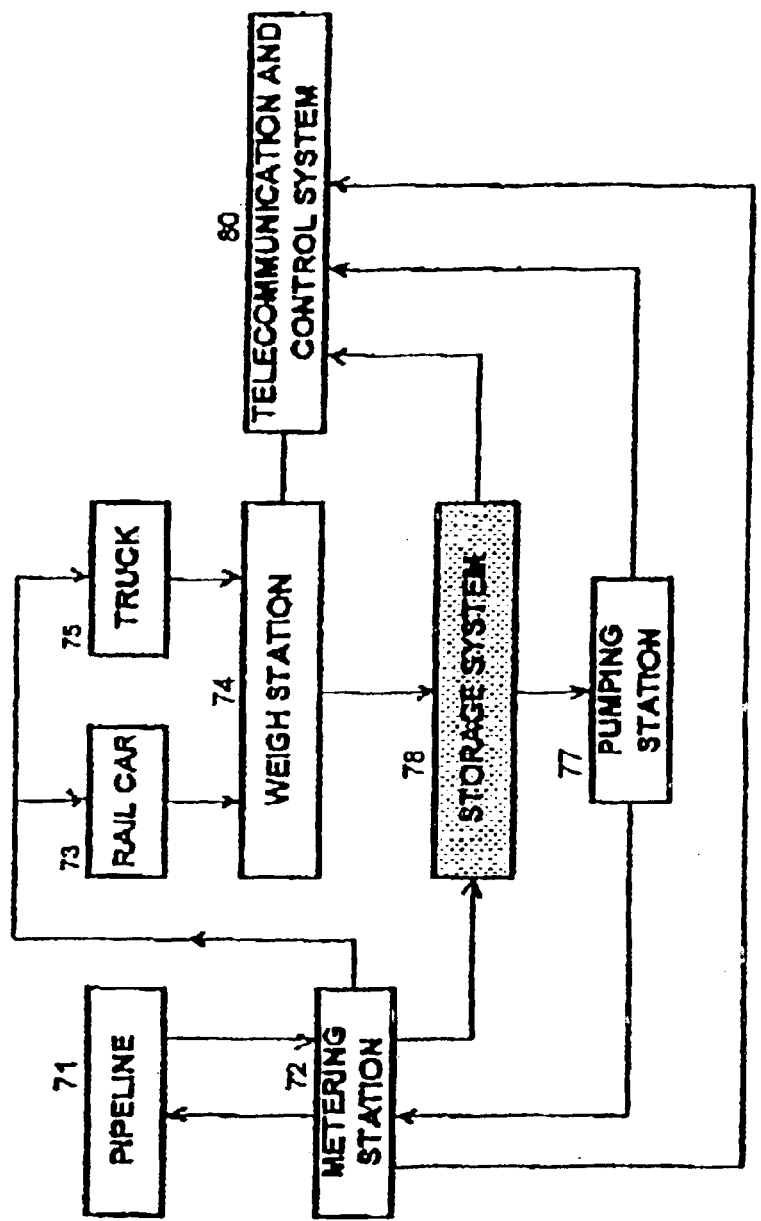
FIG. 5 is another block diagram of the exemplary embodiment of a system for storing propane or butane.

FIG. 5 is a block diagram of a system specifically adapted for storing liquefied propane or butane 70. When the storage service system is arranged or configured for use of liquefied propane or butane storage 70 and service, the system may include an inlet piping and control valve system for delivery of propane or butane from one or more supply sources: a pipeline connection 71, rail car 73 or truck 75. One or more weigh stations 74 provide for the weighing of the delivery vehicles to verify the amount of material (liquid) being received or removed from storage. A liquid metering station 72 is used to measure the liquefied propane or butane delivered to, or removed from, a pipeline connection. A pumping station 77 is used to help evacuate the liquid from rail car 73 or truck 75. This pumping station 77 can also be designed for outlet pumping from the storage facility 78, to a truck 75, railcar 73, or a pipeline connection 71. A telecommunication and control station (TCS) 80 monitors the weigh station 74, a pumping station 77, the liquid metering station 72, the storage system 70, and the outlet pumping storage facility for propane or butane 78.

Figure 6:
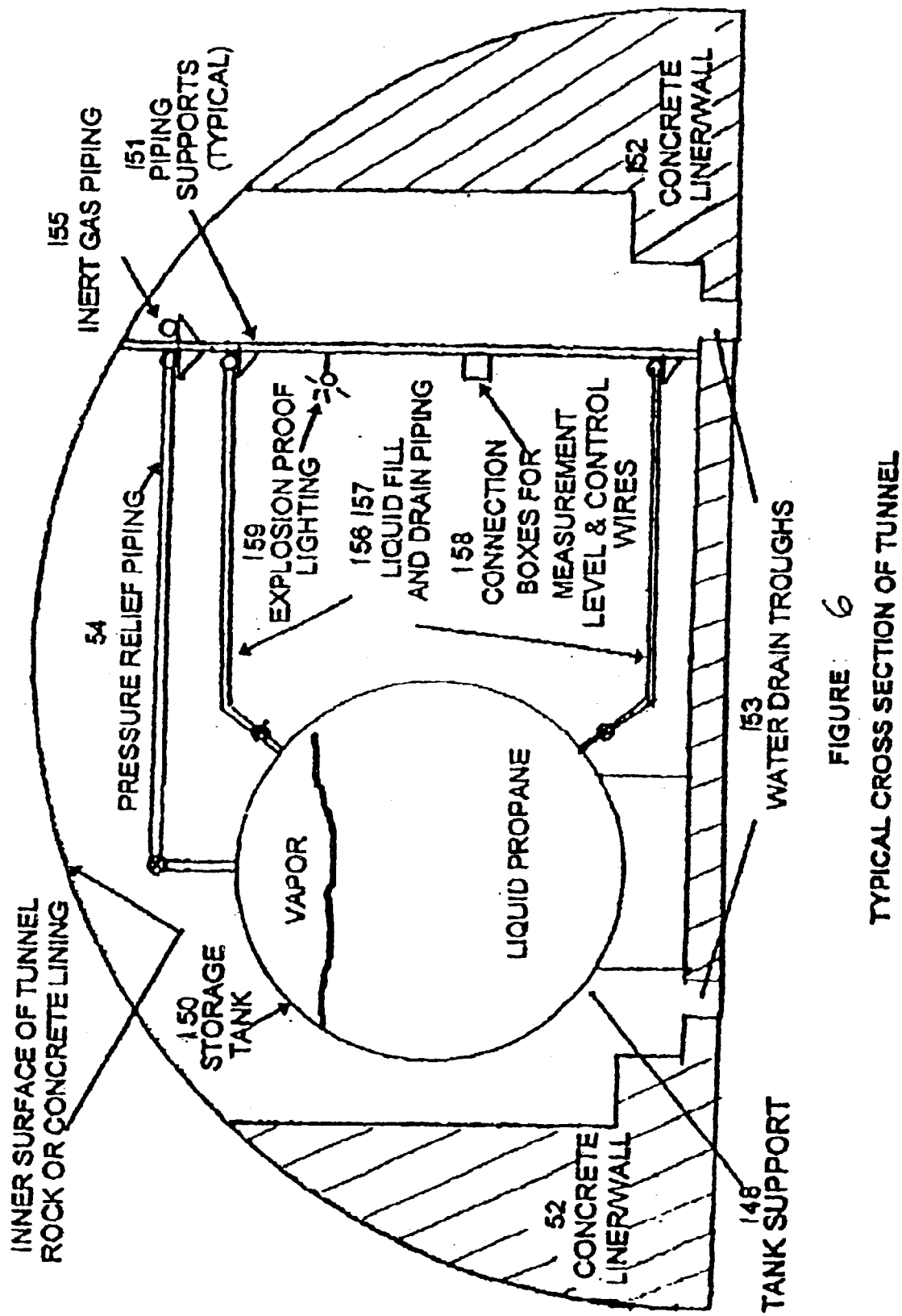
FIG. 6 shows a vertical cross section of an example tunnel used for storage.

FIG. 6 is a cross section of a Tunnel according to an exemplary embodiment. As shown, the Tunnel includes a Storage Tank 150, supported by a Tank Support 148. The Water drain Troughs 153 are shown. The side walls of the tunnel have a concrete liner 152. The Liquid Fill Piping 156 fills the Storage Tank 150 and liquid is removed by the Drain Piping 157. These pipes are supported by the Piping Supports 151. The Piping Supports 151 also support the Inert Gas Piping 155. The wires that relay information on liquid levels in the tanks and other operating information are spliced in the Connection Boxes 158. Lighting for the tunnel is provided for by Explosion Proof Lighting 159, also mounted on the Piping Supports 151.

Figure 7:
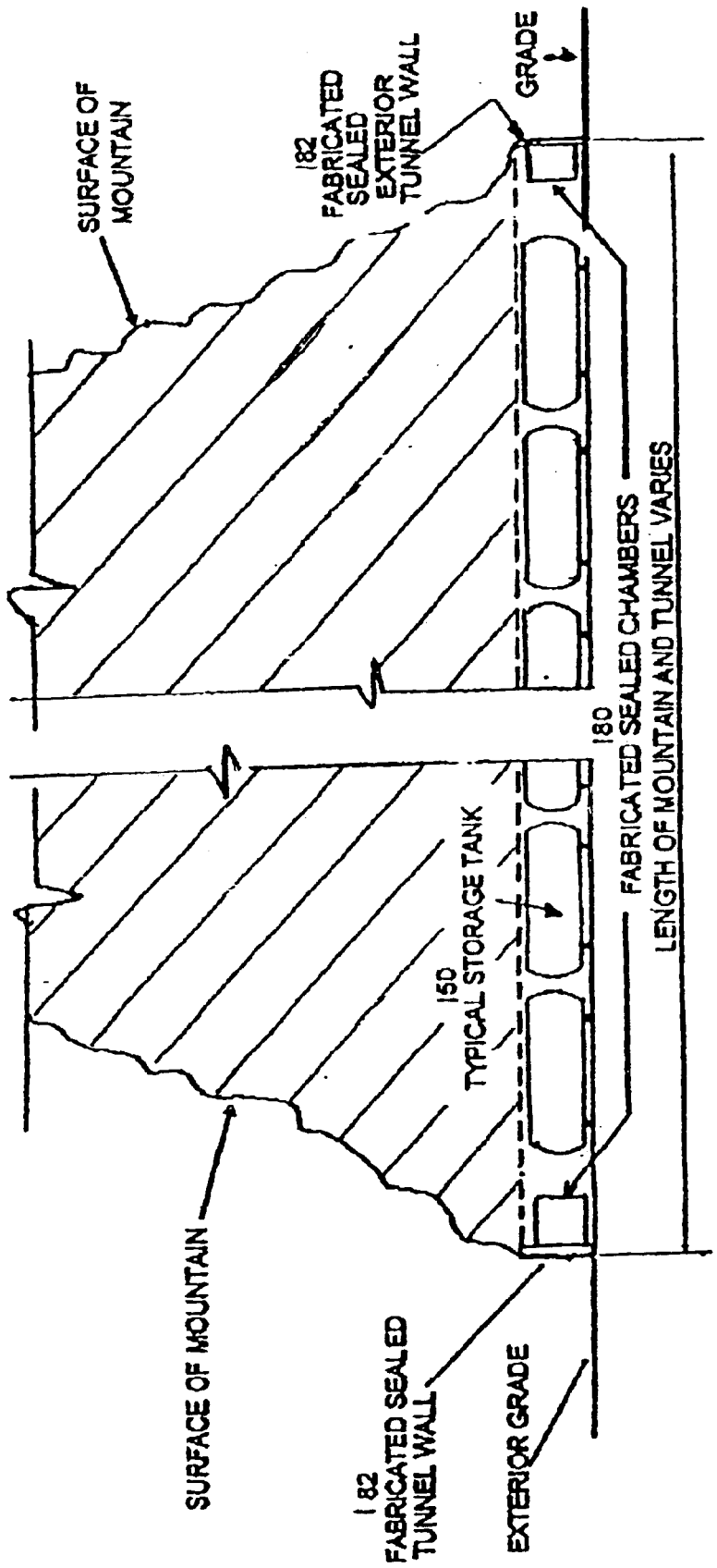
FIG. 7 shows a longitudinal section of an example tunnel with tanks in place and including fabricated gas tight end wall structures.

FIG. 7 shows a longitudinal section of the exemplary embodiment of the tunnel storage system. It shows the tunnel through the mountain and shows the Fabricated End Walls 182 that seal the tunnel at each end. This figure shows the Sealed Access Chambers 180, which are a part of the Fabricated Tunnel End Walls 182. The figure depicts a number of Storage Tanks 150 in place in the tunnel.

FIG. 8 is a view of the Fabricated End Wall 182 that seals the end of the tunnel. The figure shows the three (3) Fixed Exterior Wall Sections 161, and the Removable Wall Section 160. The Gasket Seals 163 between the joints of the Fixed Wall Sections 161 and the Removable Wall Section 160 is shown. The Figure indicates the location of the Sealed Access Chamber 180 and shows the outside Sealed Man Access Door 165 that is hinged. The figure shows the Pipe Penetrations through the Tunnel End Wall, the Tunnel Floor 162 and the outline of the Interior Concrete Liner Walls 152.

FIG. 9 shows a side view of the Fabricated Exterior Tunnel Wall 182 that seals the end of the tunnel. It shows the Sealed Access Chamber 180, which is an integral part of the wall. Also shown are the two Sealed Man Access Doors 165 that allow entrance first into the chamber, and then into the tunnel. FIG. 9 shows the continuity of the Exterior Grade into the Tunnel where it is on the same level (horizontal) as the Tunnel Floor 162.

The exemplary embodiments of the present invention use a substantially straight-line tunnel structure having an entrance at both ends, each of which is directly connected and directly accessible at ground level (horizontally) with one or more tanks permanently installed within the tunnel structure. Access for routine maintenance of the tunnel storage system and/or the tunnel structure is provided for by the two gas tight "sealed doors" provided in the fabricated end wall chambers located at each end of the tunnel.

A new tunnel may be built to the same specifications (and it is most economically) through a mountain. When an existing or abandoned transportation (vehicle or train tunnel) or an aqueduct is used, the construction of a Tunnel Storage System would start with a restoration of the tunnel structure. The first step may include dealing with any water intrusion into the tunnel. Grouting with either chemical or other type of grout may handle most water seepage. If the water intrusion problem is too severe to correct by grouting, then a water removal system may be built into the floor of the tunnel. Given that transportation (highway or railroad) tunnels are normally essentially straight both as to alignment and grade, this may be a relatively simple matter. If there is an overall grade to the tunnel, then a gravity water drain can be utilized. The water would be allowed to flow through troughs in the floor of the tunnel. If there is no grade to the tunnel then the water system must be constructed utilizing pumping chambers and gravity feeds in the floor of the tunnel structure.

According to the exemplary embodiments of the present inventions, a tunnel becomes an integral structural component for the storage of large volumes of propane or butane at ambient temperature and directly accessible at ground level.

The storage system may include the following: one tank using the tunnel structure as a housing to contain the cylinder containing liquefied propane or butane at normal storage pressure and ambient temperature; or a plurality of storage tanks or containers, using the tunnel structure as a housing to contain the storage tanks or containers, each storing liquefied propane or butane at normal storage pressure and ambient temperature.

The use of a tunnel structure for storage offers several economic advantages, including the following: longer large capacity storage containers or tanks can be used, or large numbers of conventional storage tanks can be manifolded together, and in some cases, tunnels up to one mile in length or longer may be utilized. As the storage cylinders are not buried underground, corrosion protection by cathodic protection systems can be eliminated, thus reducing initial capital costs and subsequent operating expenses, so that the potential hazard of failure resulting from external corrosive forces would be minimized. The potential for damage to the storage containers by third party excavation such as construction bulldozers and backhoes or utility pole excavations may be eliminated, and this is because the storage cylinders would be located within a tunnel surrounded by many feet of rock rather than buried underground in locations that may be susceptible to such activity. It is believed that the tunnels that may be most economically used in this exemplary embodiment are normally straight-line facilities allowing for the storage vessels to be readily available ones, with no curves being required, and this may benefit installation, maintenance, and removal of the vessels. Direct access and connection to the tunnel structure at ground level from both ends may result in a more economic construction and cost of operation than if a mined cavern or tunnel was used that did not have these characteristics. Access for maintenance of the storage system and/or the tunnel structure is available at each end directly through the two sealed access doors in the fabricated end wall chamber structure directly accessible (horizontally) at ground level.

The use of an existing tunnel structure, in particular a railroad tunnel, is believed to be particularly advantageous since railroad tunnels may be generally built in relatively straight lines. Further, the tunnel would generally have a relatively straight-line change in grade. The use of this type of "straight-line" structure is believed to be particularly advantageous from both the installation point of view, and from an economic point of view, for the fabrication and installation of the storage vessels that are contained in the structure.

Above ground storage tanks and particularly large refrigerated storage tanks are believed to be at risk for airplane crashes. This may involve public and regulatory concerns, which are at least reduced by the tunnel system. Furthermore, the tunnel storage system may be "more easily secured" against various threats than above ground storage tanks.

The openings of the tunnel structure of the type described herein are at "ground level", and are not subterranean. This means that access to "underground" storage systems are at grade, and are thus directly accessible. Furthermore, the system includes two access arrangements. The direct access at grade, and the "flatness and straightness" of these types of tunnel structures, minimizes the cost of pumping to remove ground water, which is a concern with almost all tunnels. With little or no lifting required, initial costs for pumps and continuing operating costs may be minimized or at least reduced.

Natural storage caverns may risk losing the injected fuel through flaw(s) in the leached salt or mined caverns. The tunnel storage system, because of the use of tanks or pipes, does not have this risk.

Utilization of an abandoned or unused tunnel is an enhancement of the environment, especially when the abandoned facility is open and accessible to the public, particularly since the access arrangement is at grade. The utilization of the abandoned facility may also eliminate a public hazard or an attractive nuisance. From a civic and community point of view, it may convert a liability into a taxable asset. Elimination of this inherent and potential liability currently incurred by the responsible party (if they are a viable and solvent organization) would be beneficial to such owner, as well as to the general public in the immediate area.

The exemplary embodiments of the present inventions may provide a safe storage system, because the large volume of rock above the actual utilized tunnel storage system should provide safe storage. Similarly, third party damage from digging may be substantially eliminated or at least reduced. The storage system should also be less subject to damage by the weather and should be better protected from lighting strikes. Damage potential from tornadoes or similar high wind weather conditions may also be a lesser concern with this storage system, as compared to above ground storage facilities.

What is claimed is:

1. A fluid storage facility, comprising:
   (a) a transferring arrangement to transfer one of liquefied propane and butane from a supply source of a pipeline or at least one delivery vehicle to at least one pumping station via at least one weighing station;
   (b) the pumping station transferring the one of the liquefied propane and the butane to at least one storage vessel; and
   (c) wherein the storage vessel is secured within a tunnel that is one of a railroad tunnel, a highway tunnel and an aqueduct tunnel, the tunnel passing through the earth, and including an opening at each end of the tunnel, and containing the at least one storage vessel for the storage of the one of the liquefied propane and the butane.

2. The fluid storage facility of claim 1, wherein the at least one storage vessel includes a plurality of storage vessels manifolded together to act as a single storage arrangement.

3. The fluid storage facility of claim 1, further comprising: first and second gas tight end walls at each end of the tunnel to seal the tunnel, the first and second end walls including attached sealed chambers, each chamber having two gas tight sealed access doors allowing entrance first into the corresponding chamber and then into the tunnel.

4. The fluid storage facility of claim 3, wherein the tunnel is filled with a mixture of air and an inert gas at a pressure slightly higher than atmospheric to prevent combustion.

5. The fluid storage facility of claim 4, wherein the inert gas is nitrogen.

6. The fluid storage facility of claim 4, further comprising:
   a first pipeline coupled to the pumping station and to the at least one storage vessel to fill the at least one storage vessel;
   a second pipeline coupled to the pumping station and to the at least one storage vessel for removing liquid from the at least one storage vessel;
   a third pipeline coupled to the pumping station and to the at least one storage vessel for transporting any gas that is released through over pressure valves on the at least one storage vessel; and
   a fourth pipeline coupled to the pumping station to introduce the inert gas into the tunnel.

7. The fluid storage facility of claim 6, further comprising:
instrumentation wiring coupled to the at least one storage vessel;
wherein the first, second, third and fourth pipelines, and the instrumentation wiring pass through at least one of the gas tight end walls.

8. A fluid storage facility for storing one of liquefied propane and butane, comprising:
a tunnel that is one of a railroad tunnel, a highway tunnel and an aqueduct tunnel, the tunnel passing through the earth, and including an opening at each end of the tunnel; and
a fluid storage arrangement including:
a transferring arrangement to transfer the one of the liquefied propane and the butane from a supply source or at least one delivery vehicle to at least one pumping station via at least one weighing station; and
the pumping station transferring the one of the liquefied propane and the butane to at least one storage vessel secured within the tunnel.

9. The fluid storage facility of claim 8, wherein the at least one storage vessel includes a plurality of storage vessels manifolded together to act as a single storage arrangement.

10. The fluid storage facility of claim 8, further comprising:
first and second gas tight end walls at each end of the tunnel configured to seal the tunnel, the first and second end walls including attached sealed chambers, each chamber having two gas tight sealed access doors allowing entrance first into the corresponding chamber and then into the tunnel.

11. The fluid storage facility of claim 10, wherein the tunnel is filled with a mixture of air and an inert gas at a pressure slightly higher than atmospheric to prevent combustion.

12. The fluid storage facility of claim 11, wherein the inert gas is nitrogen.

13. A fluid storage facility comprising:
a tunnel that is one of a railroad tunnel, a highway tunnel and an aqueduct tunnel, the tunnel passing through the earth, and including an opening at each end of the tunnel; and
a fluid storage arrangement including:
a transferring arrangement to transfer one of liquefied propane and butane from at least one delivery vehicle to at least one pumping station via at least one weighing station;
the pumping station transferring the one of the liquefied propane and the butane to at least one storage vessel secured within the tunnel.

14. The fluid storage facility of claim 13, wherein the at least one storage vessel includes a plurality of storage vessels manifolded together to act as a single storage arrangement.

15. The fluid storage facility of claim 13, further comprising:
first and second gas tight end walls at each end of the tunnel configured to seal the tunnel, the first and second end walls including attached sealed chambers, each chamber having two gas tight sealed access doors allowing entrance first into the corresponding chamber and then into the tunnel.

16. The fluid storage facility of claim 15, wherein the tunnel is filled with a mixture of air and an inert gas at a pressure slightly higher than atmospheric to prevent combustion.

17. The fluid storage facility of claim 16, wherein the inert gas is nitrogen.

* * * * *